UNITED STATES PATENT OFFICE 2,682,563

PROPENYL HYDROQUINONES AS ANTIOXIDANTS

Alan Bell, M B Knowles, and Clarence E. Tholstrup, Kingsport, Tenn., assignors to Eastman Kodak Company, Rochester, N. Y., a corporation of New Jersey No Drawing. Application May 31, 1951, Serial No. 229,281

2 Claims. (Cl. 260—625)

This invention relates to the stabilization of fats, oils and other organic materials subject to deterioration employing compounds as antioxidants which are believed to have never been heretofore prepared and which are generically termed hereinbelow as propenyl derivations of hydroquinone.

The prior art contains reference to the use of allyl derivatives of ethers of hydroquinone as antioxidants for fats and oils, e. g. U. S. Patent No. 2,310,710 which mentions the methyl ether of allylhydroquinone. Propenyl derivatives of ethers of hydroquinone have been described such as the dimethyl ether of isopropenyl hydroquinone, cf. Kauffman and Beisswenger, Berichte, 38, 792; the dimethyl ether of propenyl hydroquinone, cf. Thoms, Berichte, 36, 858; the dimethyl ether of alpha,beta-dimethylpropenyl hydroquinone, cf. Lauer and Renfrew, J. Am. Chem. Soc., 67, 808–10. U. S. Patent No. 2,296,363 discloses polymers of isopropenyl hydroquinone. This patent contains the only known reference to the use of propenyl derivatives of hydroquinone as antioxidants; however, the process for preparing the compounds of that patent results in the preparation of polymeric products which are not effective in the stabilization of fats and oils.

We have now found that monomeric propenyl derivatives of hydroquinone having the following formula are valuable antioxidants, especially for fats and oils:

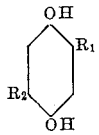

wherein $R_1$ represents a member selected from the group consisting of a propenyl radical and an isopropenyl radical and $R_2$ represents a member selected from the group consisting of a hydrogen atom, an alkenyl radical having the formula $C_nH_{2n-1}$ where $n$ represents an integer of from 2 to 10 (examples of such alkenyl radicals include vinyl, allyl, propenyl, isopropenyl, isobutenyl, hexenyl, etc.), an alkyl radical of the formula $C_mH_{2m+1}$ where $m$ represents an integer of from 1 to 10 (examples of such alkyl radicals include methyl, ethyl, propyl, isopropyl, tertiary butyl, hexyl, tertiary octyl, etc.) and an aryl radical of the benzene series containing from 6 to 9 carbon atoms (examples include phenyl, tolyl, xylyl, etc.). Most advantageously we prefer to employ the following propenyl derivatives of hydroquinone selected from the above defined compounds: 1,4-dihydroxy-2-(1-propenyl) benzene hereinafter called propenyl hydroquinone, the formula for which is:

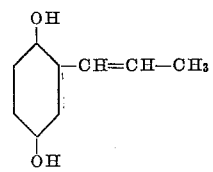

1,4-dihydroxy-2,5-di(1-propenyl) benzene hereinafter called dipropenyl hydroquinone, the formula for which is:

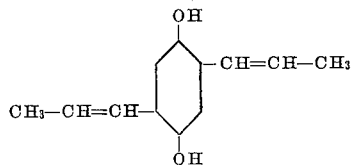

1,4-dihydroxy-2,5-diisopropenyl-benzene hereinafter called diisopropenyl hydroquinone, the formula for which is:

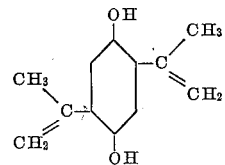

In all of the compounds of this invention, the $R_1$ substituent side chain contains a double bond in conjugated relationship to a double bond in the benzene ring nucleus. This is one of the distinguishing characteristics of the propenyl derivatives of hydroquinone of this invention and is believed to be in a large measure responsible for their unusual antioxidant properties. In this regard it can be noted that when these compounds are polymerized, the extra-nuclear double bonds disappear in all but the end units of the polymer chain, to the consequent detriment of the antioxidant properties of these compounds in polymeric form.

In this connection it can be noted that $R_1$ can also be written as $-CR_3=CHR_4$ wherein $R_3$ and $R_4$ each represents a hydrogen atom or a methyl radical, $R_3$ being different from $R_4$. However, if $R_3$ and $R_4$ each represents a hydrogen atom, then $R_1$ is a vinyl radical; vinyl hydroquinone can be prepared as described by Updegraff and Cassidy, J. A. C. S. 71, 407 (1949) and is a very potent antioxidant. However, it has a tendency to polymerize and does not therefore have the practical value of propenyl hydroquinone. Thus, monomeric vinyl hydroquinone has a protection factor (defined hereinbelow) of close to 50 in lard at a concentration of 0.02 per cent, whereas under the same conditions the protection factor for hydroquinone is close to 30; however, when vinyl hydroquinone is polymerized, its protection factor is actually less than 1.0. When $R_3$ represents a methyl radical and $R_4$ a hydrogen atom, then $R_1$ is an isopropenyl radical. The compound isopropenyl hydroquinone in its polymeric form is set forth in U. S. Patent 2,296,363, referred to above, and, as also pointed out above, this compound in its monomeric form is not described therein. Like vinyl hydroquinone, the monomer has a tendency to polymerize, which reduces its value as an antioxidant; however, by a process described hereinbelow, the monomer can be prepared and is effective on a practical basis as an antioxidant for fats and oils. The straight chain propenyl hydroquinones are even more effective.

In view of the reduction in or absence of antioxidant effectiveness of polymerized propenyl hydroquinone derivatives, such polymers are specifically excluded from the scope of this invention.

The discovery that the existence of improved antioxidant properties results from the above described conjugated double bond relationship is unexpected, inasmuch as the antioxidant property function of the nuclear substituents of hydroquinone is but little understood. To emphasize this point, it can be noted that in a certain test 2,5-diallyl hydroquinone had a protection factor of 6.6 at a concentration in lard of 0.02 per cent, whereas under the same conditions, 2,5-dipropenyl hydroquinone had a protection factor of 10.6. A similar superiority exists in favor of the monopropenyl derivative over the mono-allyl derivative. No explanation is known as to why the conjugated double bond relationship should produce this marked improvement, nor is it known for certain that this double bond relationship is necessarily a determining factor. For instance, in other tests it has been shown that the dipropenyl derivatives of catechol do not show any appreciable improvement over the diallyl derivatives, which is contrary to the situation where the hydroquinone derivatives are concerned. From these tests, it would be considered unexpected to find that the propenyl hydroquinone derivatives show the marked improvement disclosed in this specification.

It is an object of our invention to provide novel antioxidants possessing improved properties which are particularly useful in the stabilization of fats and oils. Another object is to provide such antioxidants, which are relatively insoluble in aqueous media but which are soluble in fats, oils, petroleum solvents, and other organic compounds whereby such antioxidants have improved carry-over properties when a fat or oil stabilized therewith is employed in preparing cooked foods. Other objects will become apparent hereinafter. Among these objects is the provision of novel compounds which are capable of a more uniform effect over a wide range of fats and oils, irrespective of the specific oil or fat treated.

The propenyl derivatives of hydroquinone which have been specifically set forth above can be prepared as illustrated by the following examples, wherein all parts are by weight. Example 1 gives a preferred method for preparing the starting material employed in Example 2 for making propenyl hydroquinone.

EXAMPLE 1

Allylhydroquinone

Hydroquinone monoallyl ether was slowly heated with stirring in a nitrogen atmosphere until the temperature reached about 200° C. At this point the temperature rapidly rose to 225° C. without application of external heat. When the reaction began to subside, as indicated by a drop in temperature, the solution was heated in order to maintain the temperature at 225–240° C. from about 30 to 45 minutes. The solution was cooled to 100° C. and then dissolved in four times its volume of hot benzene. This solution was then allowed to cool somewhat and hexane was added until the solution became cloudy. Upon cooling white crystals formed and these were separated whereby an almost quantitative yield was obtained of allylhydroquinone. Allylhydroquinone is also described by Smith, Hoehn and Whitney, J. Am. Chem. Soc., 62, 1863–69.

Allylhydroquinone can be converted to propenyl hydroquinone (see Formula I above) in the following manner:

EXAMPLE 2

Propenyl hydroquinone

A solution consisting of 40 parts of allylhydroquinone, 40 parts of water and 80 parts of potassium hydroxide (all parts being by weight) was heated at 170° C. in an atmosphere of nitrogen for one hour. The solution was then cooled, diluted with 100 parts of water, and poured into a mixture of ice and hydrochloric acid of sufficient amount to make the resulting mixture slightly acid. A pink solid formed which was extracted with boiling benzene. The benzene solution was cooled and white crystals formed which were filtered off to give 20 parts of propenyl hydroquinone. This compound which was obtained had a melting point of 132–137° C.

Diisopropenyl hydroquinone whose structural formula is set forth above as Formula III can be prepared in the following manner:

EXAMPLE 3

2,5-diisopropenyl hydroquinone

Four parts of 2,5 - bis(1 - hydroxyisopropyl) hydroquinone and 0.05 part of hydroquinone were suspended in 50 parts xylene. The mixture was refluxed and a crystal of iodine added. Dehydration immediately began and the water which formed was removed as its xylene azeotrope. After 30 minutes all the water had been removed. The solution was cooled, filtered, and the xylene removed by distillation under reduced pressure. The residual oil was extracted several times with hot hexane. This left an insoluble, gummy resinous by-product which was polymeric 2,5-diisopropenyl hydroquinone. The several hexane extracts were combined and evaporated (after adding a trace of hydroquinone) to a small volume. This solution was then allowed to cool whereupon white crystals of 2,5-diisopropenyl hydroquinone were deposited. These crystals can be recrystallized from hexane or naphtha to increase their purity. The product has a melting point of 114–116° C. The reaction described above can also be carried out in other solvents than xylene, such as toluene, benzene, hexane, etc. However, when such solvents are lower boiling in nature, the dehydration is slower. The 2,5-bis(1-hydroxyisopropyl) hydroquinone employed in this process is a new compound which has not been described in the prior art. Its preparation is not a part of this invention; however, it can be prepared as follows:

A mixture of 3.12 moles of dimethylethinyl carbinol, 1.05 moles of monoethanolamine and 1.1 moles of water was stirred, heated to 98–100° C. and 1.0 mole of iron pentacarbonyl was fed in over a one-hour period. The reaction was quenched with 375 grams of ice water and neutralized with hydrochloric acid and filtered. The crystalline product was washed with chloroform and gave a 25% yield of 2,5-bis(1-hydroxyisopropyl) hydroquinone having the following formula (melting point 136° C.):

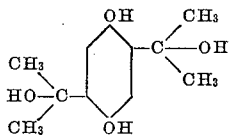

Dipropenyl hydroquinone whose structural formula is set forth above as Formula II can be prepared in the following manner:

EXAMPLE 4

*2,5-di(1-propenyl) hydroquinone*

Ten parts of 2,5-diallyl hydroquinone and 25 parts of water were placed in a flask and the flask swept with nitrogen while the mixture was stirred and 40 parts of potassium hydroxide added. With continued stirring, the solution was heated under an atmosphere of nitrogen in an oil bath at 170° C. for one hour. The resulting solution was cooled, and an ice-hydrochloric acid mixture was added until the solution became acidic. The resulting solid which formed was filtered, washed with water, dried, and dissolved in hot ethyl alcohol. Some solid sodium hyposulfite ($Na_2S_2O_4$) was added to the alcoholic solution to remove color and then the sodium hyposulfite was removed by filtration. Water was added to the hot alcoholic solution until it became cloudy. Upon cooling, the desired product separated and was recrystallized from a solution of acetic acid in water. Four parts of 2,5-di(1-propenyl) hydroquinone was produced. The product so obtained had a melting point at 208–210° C.

A propenyl derivative of hydroquinone corresponding to the structural formula set forth above where $R_1$ is propenyl and $R_2$ is tert. butyl can be prepared in the following manner:

EXAMPLE 5

*1,4-dihydroxy-2(1-propenyl)-5-tertbutylbenzene*

180 parts of t-butylhydroquinone, 92 parts of allylchloride, 1 part of zinc dust, 200 parts of methanol, and 148 parts of 33% sodium hydroxide solution were refluxed under nitrogen for three hours. The reaction mixture was diluted with water, 400 parts of benzene added, and the layers separated.

The benzene solution was washed several times with hot water to remove t-butylhydroquinone, then extracted with dilute aqueous alkali to remove 3-t-butyl-4-allyloxyphenol. Distillation of the benzene solution gave 116 parts of a liquid boiling at 96–101° (0.2 mm.). This material was essentially 2-t-butyl-4-allyloxyphenol.

Rearrangement of the allyl ether was accomplished by dissolving the ether in 280 parts of kerosene (B. P. 215°) and then refluxing the resulting solution for two hours. Upon cooling of the solution, a mixture of nearly white crystals and a dark, mushy solid separated. The crystalline material was separated mechanically. Extraction of the dark material with hot 25% acetic acid solution removed more of the crystalline product. A total of 23 parts was thus obtained which, after recrystallization from a hexane-benzene mixture, melted at 114–116° C. This material was 1,4-dihydroxy-2-allyl-5-tert-butylbenzene.

Isomerization to the corresponding propenyl derivative was done by heating 10 parts of the allyl compound, 60 parts of potassium hydroxide, 45 parts of water and 1 part of triethanolamine at 130° for one hour. An inert atmosphere of nitrogen was used. The cooled mixture was diluted with water, acidified with hydrochloric acid, and then extracted with ether. Extraction of the ether soluble material with hot hexane gave 2.5 parts of product which melted at 114–116° C. This material depressed the melting point of the above allyl compounds.

The antioxidant properties of this compound are omitted from the table presented further on in this specification which deals with derivatives of hydroquinone containing only propenyl and isopropenyl groups in order to avoid presenting an unduly complex array of data therein. However, the protection factor of the 1,4-dihydroxy-2-(1-propenyl)-5-tert. butylbenzene at a concentration of 0.02% by weight in lard having an AOM value of 11.5 hours was determined by test to be 3.3, while the corresponding protection factor of the 1,4-dihydroxy-2-allyl-5-tert. butylbenzene under the same conditions was found to be 1.5.

From this data it can be seen that the propenyl derivative of an alkylated hydroquinone is clearly superior to the corresponding allyl derivative.

The various propenyl derivatives of hydroquinone, particularly those described (propenyl hydroquinone, dipropenyl hydroquinone and diisopropenyl hydroquinone) are quite useful as antioxidants for fats and oils as indicated, above. When so employed, fractions of a per cent of such compounds can be incorporated in such materials as lard, cottonseed oil, peanut oil, etc., by admixing the propenyl derivatives of hydroquinone with the fats or oils whereby a solution of the antioxidant in the substrate is obtained. Alternatively, the antioxidant can be blended with suitable solvents to form an antioxidant solution. Examples of such solvents include glycerin and propylene glycol. Such antioxidant solutions can be more readily dissolved in the fat or oil to be stabilized with less necessity for prolonged mixing of the fat or oil with the undissolved antioxidant. Similarly, synergists can be admixed with the fats or oils along with the dry antioxidant compounds of our invention or, in order to facilitate the incorporation of the antioxidant and synergist into the fat or oil, they can both be dissolved in such solvents as hexane, propylene glycol, glycerin, or other similar solvents which are inert insofar as both the antioxidant-synergist composition and the ultimately prepared stabilized fat or oil is concerned. Examples of synergists which can be employed include citric acid, tartaric acid, phosphoric acid, ascorbic acid, etc., and amino acids such as alanine, cysteine, etc. In addition to the presence of a propenyl derivative of hydroquinone in the above antioxidant compositions, two or more of such derivatives can be simultaneously employed in such compositions and/or other antioxidants can be added for their supplemental effects if such be desired.

In addition to the fats and oils mentioned above which can be stabilized by the antioxidants of our invention, other representative fats and oils include linseed oil, menhaden oil, cod liver oil, castor oil, olive oil, rapeseed oil, cocoanut oil, palm oil, corn oil, sesame oil, peanut oil, babassu oil, butter fat, lard, beef tallow, etc., as well as hydrogenated oils and fats prepared from any of the foregoing. Furthermore, various other oils and fats may be similarly treated within the scope of the present invention.

Inasmuch as it is well known in the art to employ antioxidants in the stabilization of fats and oils, it is not believed necessary to give numerous specific examples of how the antioxidants of this invention are blended with fats and oils nor the specific proportions which can be employed. The methods of blending antioxidants and synergists with particular fats and oils can be readily determined by those skilled in the art. The range of antioxidant proportions which can be employed is from about 0.001 percent up to as much as 1.0 percent or more by weight of the antioxidants of this invention, depending upon the effects desired. Generally a range of proportions of from about 0.001% to about 0.1% is advantageous with the upper limit being usually fully satisfactory if it does not exceed 0.05%. When solvents are employed in preparing antioxidant solutions, such solvents can be present in an amount just sufficient to dissolve the antioxidant up to any larger amount which may be desired especially if larger amounts are necessary to fully dissolve other supplementary antioxidants and/or synergists which may be incorporated into the antioxidant solution.

The following tabulation of data is presented in order to show the properties of propenyl hydroquinone (PHQ), dipropenyl hydroquinone (D P H Q), and diisopropenyl hydroquinone (DIPHQ) as they compare with each other. Data for a well-known antioxidant, viz. 2,5-ditertbutylhydroquinone (DTBHQ) is also presented as being typical of the comparative superiority of the antioxidants of this invention insofar as concerns their employment in the substrates being stabilized during the tests whose results are tabulated:

COMPARATIVE ANTIOXIDANT PROPERTIES

| Antioxidant and Synergist | Lard | | Cottenseed Oil | | Peanut Oil | |
|---|---|---|---|---|---|---|
| | AOM | P. F. | AOM | P. F. | AOM | P. F. |
| Control | 3.5 | 1.0 | 5.5 | 1.0 | 12.5 | 1.0 |
| Concentration of 0.01% of: | | | | | | |
| PHQ | 72.0 | 20.6 | 23.5 | 4.3 | 29.0 | 2.3 |
| DIPHQ | 30.0 | 8.6 | 16.0 | 2.9 | 23.0 | 1.9 |
| DPHQ | 23.5 | 6.7 | 23.0 | 4.2 | 33.0 | 2.7 |
| DTBHQ | 5.5 | 1.6 | 14.5 | 2.6 | 19.5 | 1.5 |
| Concentration of 0.005% citric acid and 0.01% of: | | | | | | |
| PHQ | 77.0 | 22.0 | 24.0 | 4.4 | 58.0 | 4.6 |
| DIPHQ | 31.5 | 9.0 | 16.0 | 2.9 | | |
| DPHQ | 24.5 | 7.0 | 23.0 | 4.2 | 47.5 | 3.8 |
| DTBHQ | 7.0 | 2.0 | 14.5 | 2.6 | 30.0 | 2.4 |
| Concentration of 0.02% of: | | | | | | |
| PHQ | 122.0 | 34.9 | 30.0 | 5.5 | 59.5 | 4.8 |
| DIPHQ | 42.0 | 12.0 | 21.0 | 3.8 | 23.5 | 1.9 |
| DPHQ | 37.0 | 10.6 | 33.0 | 6.0 | 44.5 | 3.6 |
| DTBHQ | 9.0 | 2.6 | 21.0 | 3.8 | 19.0 | 1.5 |

The data presented above is based on tests conducted under the same conditions employing similar samples in each instance of lard, cottonseed oil and peanut oil. The AOM figures are in hours; the symbol P. F. represents the protection factor which is the ratio of the AOM value of the stabilized substrate to that of the control which contains no antioxidant. The procedure employed under the AOM (active oxygen method) is well known in the antioxidant art and need not be explained in this specification. Some of the data presented above includes the effect of employing a synergist together with the primary antioxidant. Citric acid has been selected as a typical synergist. All percentages are by weight.

Propenyl hydroquinone possesses particularly noteworthy properties in lard as the substrate. As far as we know, propenyl hydroquinone is the best antioxidant for lard, under the conditions of the tests whose results are tabulated below, of any of the compounds which have been subjected to similar tests except for vinyl hydroquinone whose undesirable tendency to polymerize has been discussed above. At lower concentrations, dipropenyl hydroquinone has antioxidant properties in the vegetable oils tested which are of the same order of magnitude as the antioxidant properties of propenyl hydroquinone; the data makes it quite clear that dipropenyl hydroquinone is extremely effective for the stabilization of peanut oil and other vegetable oils especially when used with citric acid as a synergist. The data set forth below also makes it clear that dipropenyl hydroquinone is superior to diisopropenyl hydroquinone in vegetable oils such as peanut oil and cottonseed oil; diisopropenyl hydroquinone is the least effective of the propenyl derivatives of hydroquinone in this regard and is not outstandingly superior to 2,5-ditertiary butylhydroquinone except in an animal fat such as lard.

In addition to the employment of propenyl derivatives of hydroquinone in the stabilization of fats and oils, these compounds can be employed as antioxidants, preservatives, stabilizers, or deterioration retarders for other purposes of similar nature such as for the preservation of the caroten content of alfalfa, for the retardation of deterioration of petroleum hydrocarbons, for the stabilization of synthetic resins and for other related uses such as for the stabilization of pyrethrum.

The compounds of our invention are of considerable practical value in the antioxidant field as regards edible fats and oils inasmuch as they are relatively insoluble in water but are soluble in petroleum solvents and in fats and oils. The solubility of these compounds in fats and oils and their relative insolubility in water results in the antioxidant compounds of this invention having excellent carry over properties. In other words, the blending, cooking, baking, or other processing operations performed in the combining and cooking of food products have very little effect upon the antioxidants of this invention. These antioxidants are therefore capable of performing a substantial antioxidant function in the baked, fried, or otherwise cooked product, thereby giving such a product improved shelf life. Furthermore, many of the compounds of this invention are comparatively non-toxic, hence it is believed that they will find ready acceptance in the field of preservation of foods for which they are so eminently suited.

In addition to the propenyl derivatives of hydroquinone described above, other derivatives can be prepared which conform with the general formula defined above.

Thus, 1,4 - dihydroxy - 2 - (1 - propenyl) - 5-phenylbenzene can be prepared in a manner similar to that described in Examples 1 and 2, starting with 4-hydroxy-1-allyloxy-5-phenylbenzene which can be made by normal etherification procedures applicable to phenolic compounds.

We claim:

1. A process for preparing propenylhydroquinone comprising heating allylhydroquinone, in the presence of aqueous potassium hydroxide.

2. A process for preparing propenylhydroquinone comprising heating allylhydroquinone at about 170° C. in the presence of aqueous potassium hydroxide.

References Cited in the file of this patent

UNITED STATES PATENTS

| Number | Name | Date |
|---|---|---|
| 2,064,610 | Hunt | Dec. 15, 1936 |
| 2,296,363 | Wesser | Sept. 22, 1942 |

OTHER REFERENCES

Updegraff et al.: Jour. Amer. Chem. Soc., vol. 71, pages 407–410 (February 1949).